United States Patent [19]
Lew

[11] Patent Number: 5,095,760
[45] Date of Patent: Mar. 17, 1992

[54] VORTEX FLOWMETER WITH DUAL SENSORS

[76] Inventor: Hyok S. Lew, 7890 Oak St., Arvada, Colo. 80005

[21] Appl. No.: 605,533

[22] Filed: Oct. 29, 1990

Related U.S. Application Data

[63] Continuation of Ser. No. 348,602, May 8, 1989, abandoned.

[51] Int. Cl.$^5$ ................................................ G01F 1/32
[52] U.S. Cl. ........................................................ 73/861.24
[58] Field of Search ........................... 73/861.22, 861.24

[56] References Cited

U.S. PATENT DOCUMENTS

| | | | |
|---|---|---|---|
| 4,526,040 | 7/1985 | Matsubara | 73/861.24 |
| 4,716,770 | 1/1988 | Herzog | 73/861.24 |
| 4,862,750 | 9/1989 | Nice | 73/861.24 |

FOREIGN PATENT DOCUMENTS

| 57-54809 | 4/1982 | Japan | 73/861.24 |
|---|---|---|---|

*Primary Examiner*—Herbert Goldstein

[57] ABSTRACT

A vortex shedding flowmeter includes a vortex sensor detecting lift force generated by vortices shed from the vortex generator and experienced thereby, and a noise sensor detecting mechanical vibrations experienced commonly thereby and by the vortex sensor, wherein two electrical signals respectively generated by the vortex and noise sensors are combined in such a way that noise associated with the mechanical vibrations is cancelled therebetween and a resultant electrical signal representing the vortex shedding from the vortex generator is obtained, which resultant electrical signal provides information on the frequency and amplitude of the lift force alternating in time experienced by the vortex sensor, wherein volume flow rate of the fluid is determined from the frequency of the alternating lift force, mass flow rate of the fluid is determined as a function of the frequency and amplitude of the alternating lift force, and the density of fluid is determined from the ratio of the mass flow rate to the volume flow rate of the fluid.

65 Claims, 5 Drawing Sheets

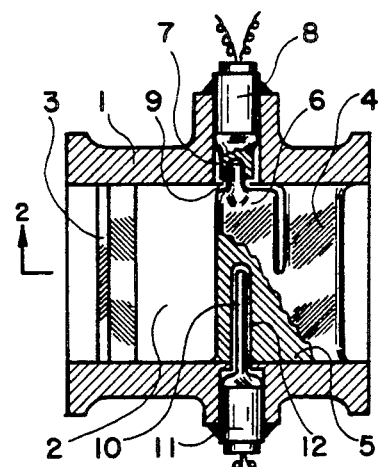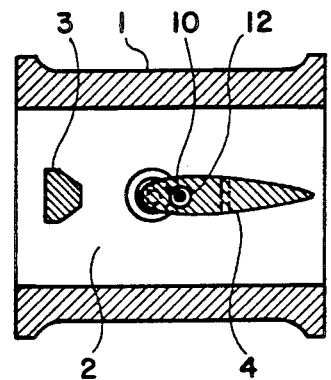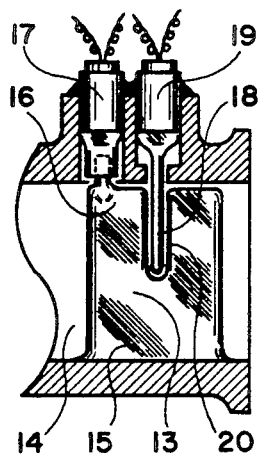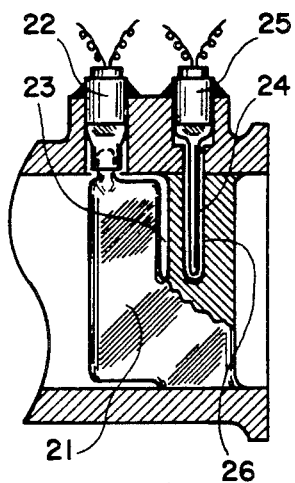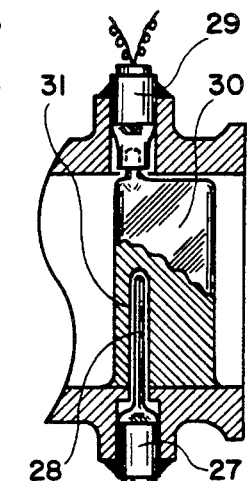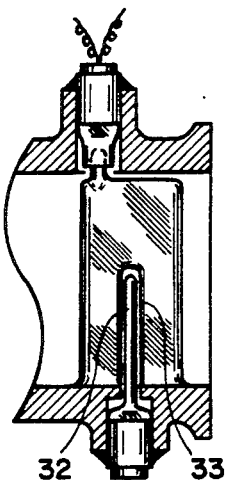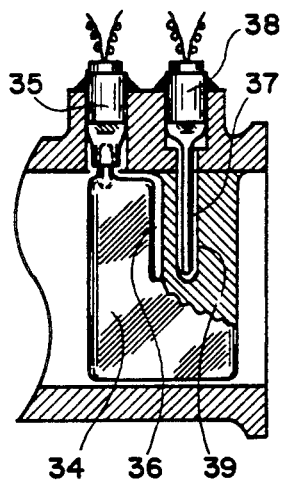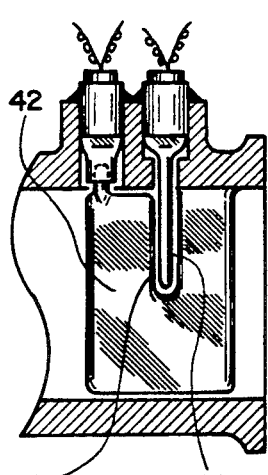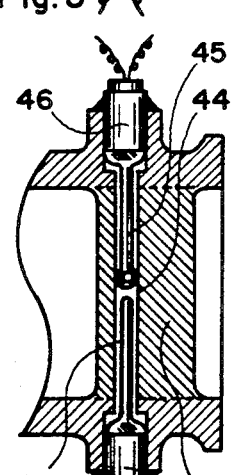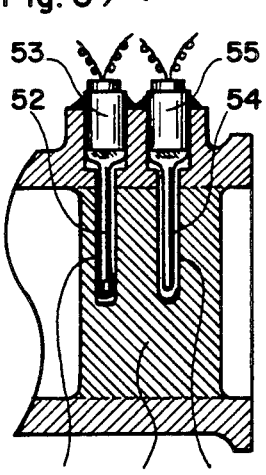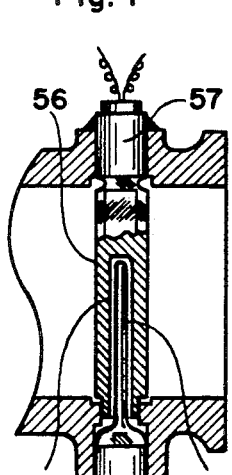

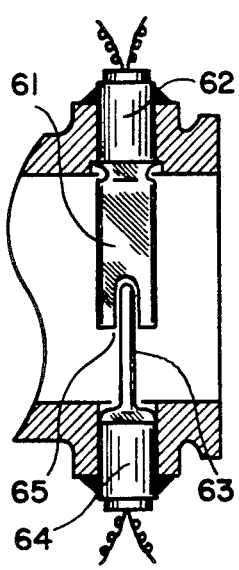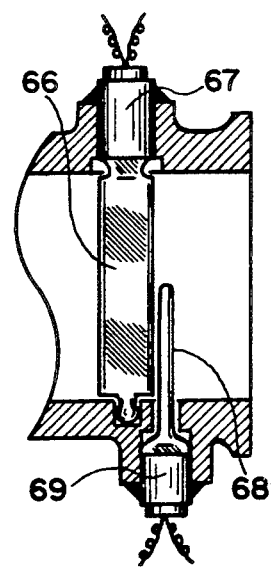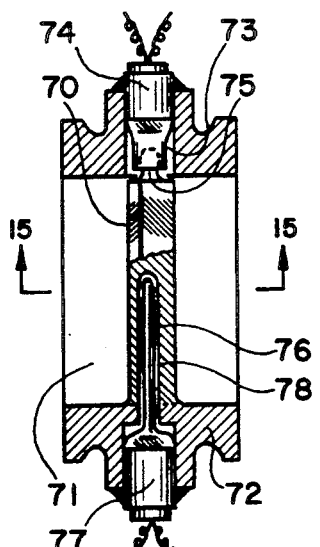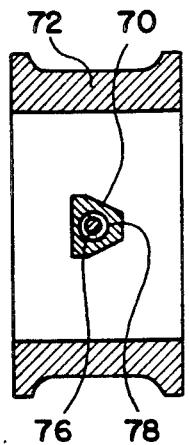
Fig. 12   Fig. 13   Fig. 14   Fig. 15
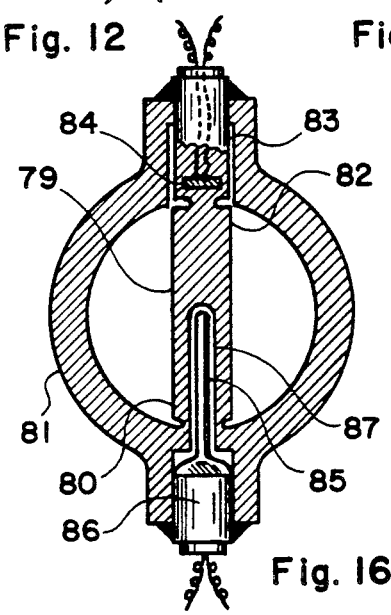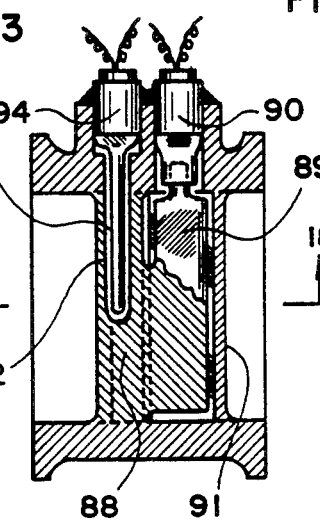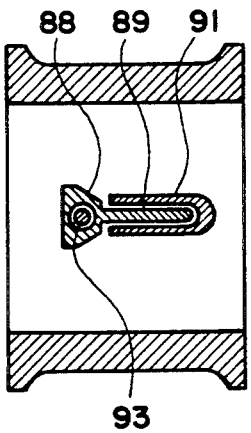
Fig. 16   Fig. 17   Fig. 18
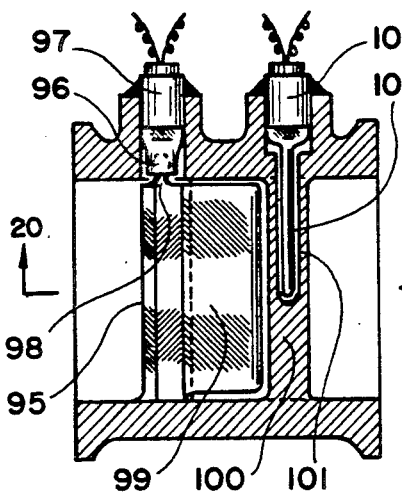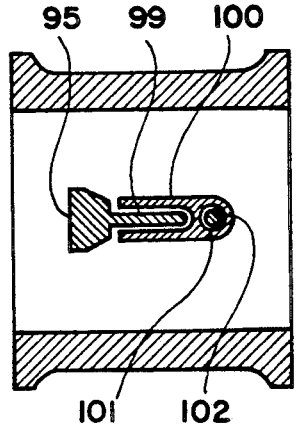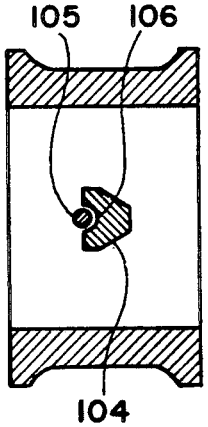
Fig. 19   Fig. 20   Fig. 21

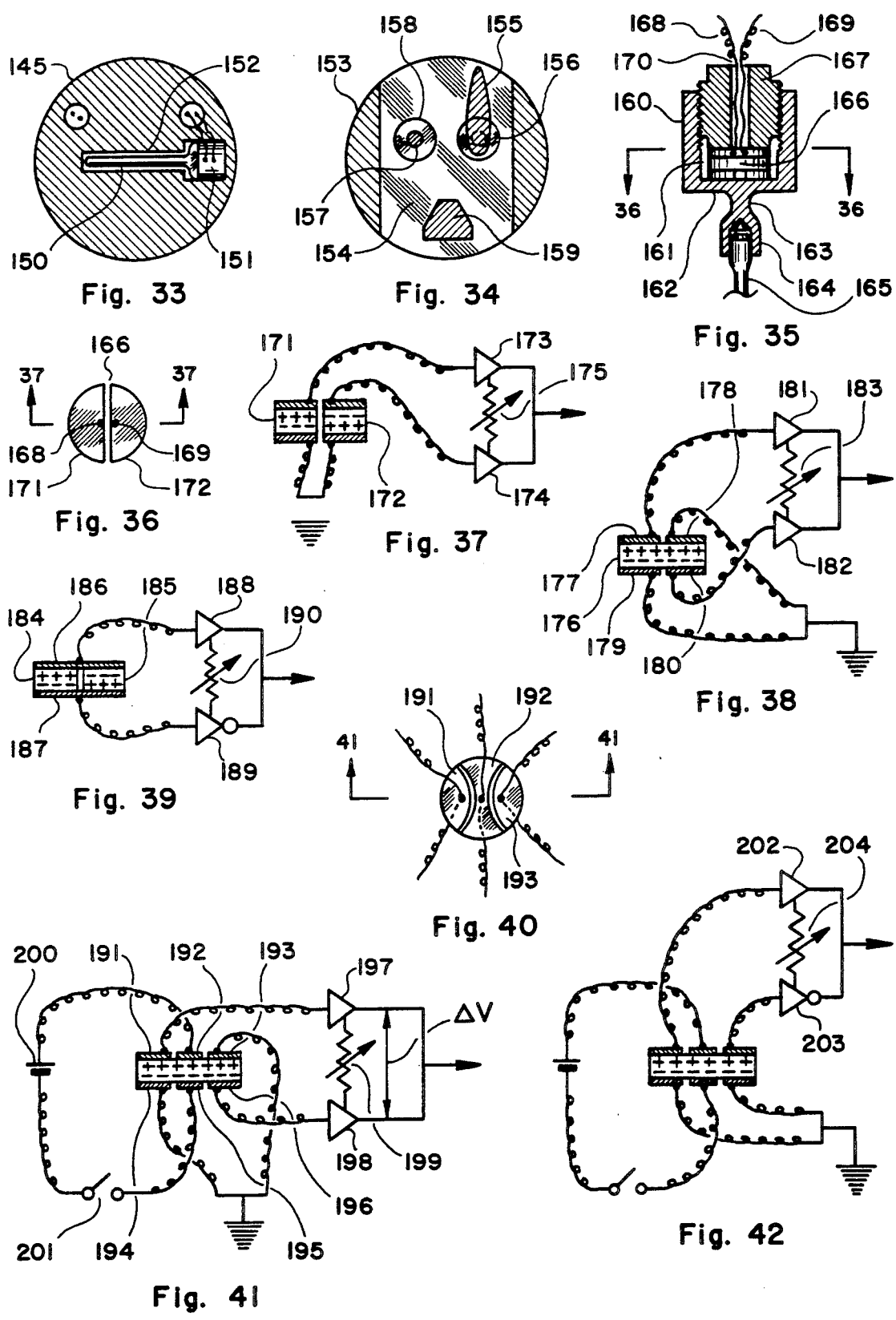

ized by the sensitivity of the flowmeter, which is the
VORTEX FLOWMETER WITH DUAL SENSORS This patent application is a continuation of patent application Ser. No. 07/348,602 entitled "Vortex Flowmeter with Dual Detectors", filed on May 3, 1989, now abandoned and consequently, the priority on the inventions described and claimed in this patent application is based on the above-mentioned parent patent application.

BACKGROUND OF THE INVENTION

As demonstrated by teachings appearing in U.S. Pat. No. 4,807,481, the vortex shedding phenomena provides a simple and powerful basis for measuring volume flow rate as well as mass flow rate, as the frequency of vortex shedding is proportional to the fluid velocity and the amplitude of the lift force experienced by a planar vortex detector disposed downstream of the vortex generating bluff body is proportional to the dynamic pressure of the fluid flow that is equal to one half of the fluid density times the square of the fluid velocity. Of course, the fluid density can be determined as a ratio of the mass flow rate to the volume flow rate. It is generally true that the quality and value of a flowmeter is judged by the sensitivity of the flowmeter, which is the ability to measure low fluid velocities. The ratio of the maximum velocity to the minimum velocity measurable by a flowmeter is called the "turn-down" ratio. The best flowmeter is one that has a high turn-down ratio. Many existing vortex flowmeters have turn-down ratios varying in the range bounded by 10 to 1 and 20 to 1 and measure the volume flow rate only. The vortex flowmeter constructed in accordance with the principles taught by U.S. Pat. No. 4,807,481 has a turn-down ratio in the range bounded by 50 to 1 and 100 to 1 and measures volume flow rate as well as mass flowrate. In carefully set-up laboratory experiments the vortex shedding phenomena takes place in a clear and regular manner in a range of fluid velocities equivalent to a turn-down ratio of 1,000 to 1. Consequently, a perfect vortex flowmeter should have a turn-down ratio at least equal to a few hundred to one. In actual practices of the vortex flowmeter, the vibration noises generated by the pipe line vibration and disturbance in the fluid flow interfere with the vortex signals and prevents the detection of weak vortices occurring in low velocity fluid flows. Therefore, the most direct road to a higher turn-down ratio of the vortex flowmeter is to employ a noise sensing detector in addition to the vortex sensing detector, wherein signals from the two detectors are combined in such a way that noise is canceled therebetween and a pure vortex signal is obtained. It is imperative to understand that, in order to cancel the noise signals detected by the noise sensing detector and the noise signals detected by the vortex sensing detector with one another, the two noises respectively detected by the noise and the vortex sensing detectors must be in common node. Otherwise, the task of canceling noise becomes hopelessly complicated and virtually impossible. In order to detect the noise in common node, the arrangement of the noise and vortex sensing detectors must satisfy the following three conditions:

1. The vortex and noise sensing detectors must be disposed at the same cross section of the flow passage. The noise generate by the structural vibrations of the pipe structures and the flowmeter body are generated by the traveling waves and the standing waves of structural vibration. If the vortex and noise sensing detectors are disposed on two different cross sections of the flow passage, the noise generated by the traveling waves propagating through the pipe line or fluid contained therein register noise of two different modes to the two detectors and consequently, they cannot be canceled therebetween.

2. The vortex and noise sensing detectors must be disposed in the interior region of the conduit providing the flow passage. The noise is generated by the vibration of the solid constituting the pipe line and the flowmeter and by the vibration of the fluid medium in the flow passage, which noise is also transmitted through the solid constituting the pipe line and the flowmeter body and through the fluid medium in the flow passage. If the vortex sensing detector is surrounded by the fluid as it is disposed within the flow passage and the noise sensing detector is surrounded by ambient air when it is disposed without the flow passage, the two detectors detect noise transmitted through two different media of different structural arrangements and consequently, having different modes. As a consequence, the noise so detected lack common modes and cannot be canceled.

3. The vortex and noise sensing detectors must have common structural elements, whereby the two detectors have substantially the same natural frequency in the structural vibrations thereof, which is the most serious source of the noise generated by structural vibration of the flowmeter assembly. When the vortex sensing detector is submerged in the fluid, while the noise sensing detector is disposed within an enclosure of heavy construction, the natural vibration of the enclosure housing the noise detecting sensor generates a high intensity noise that is exclusively registered to the noise sensing detector only, and consequently, the vortex and noise sensing detectors detect noise of different modes which cannot be canceled therebetween.

BRIEF SUMMARY OF THE INVENTION

The primary object of the present invention is to provide a vortex flowmeter comprising a vortex detector and noise detector, wherein two signals respectively generated by the two detectors are combined to cancel the noise and obtain a pure vortex signal.

Another object is to provide a vortex flowmeter with dual detectors wherein the noise detector comprises a noise sensing elongated member extending from the noise detecting transducer into a region where the vortex force sensing member is located, whereby the noise sensing elongated member and the vortex sensing member experience common vibration noise.

A further object is to provide a vortex flowmeter comprising a planar vortex force sensing member disposed downstream of and generally parallel to a vortex generating bluff body and connected to a transducer, and a noise sensing elongated member extending from another transducer that is disposed within a cavity included in the planar vortex force sensing member.

Yet another object is to provide a vortex flowmeter comprising a planar vortex force sensing member disposed downstream of and generally parallel to a vortex generating bluff body and connected to a transducer, and a noise sensing elongated member extending from another transducer that is disposed adjacent and generally parallel to the planar vortex force sensing member.

Yet a further object is to provide a vortex flowmeter comprising a vortex generating bluff body of an elongated cylindrical shape connected to a transducer and a noise sensing elongated member extending from another transducer that is disposed in a cavity included in the vortex generating bluff body.

Still another object is to provide a vortex flowmeter comprising a vortex generating bluff body of an elongated cylindrical shape connected to a transducer and a noise sensing elongated member extending from another transducer that is disposed adjacent and generally parallel to the vortex generating bluff body.

Still a further object is to provide a vortex flowmeter comprising a pair of planar vortex force sensing members disposed downstream of and generally parallel to a vortex generating bluff body and respectively connected to two transducers, wherein the two planar vortex force sensing members are respectively disposed at two different downstream positions separated from one another by a distance generally equally to a half wave length of the sinuating streamlines trailing the vortex generating bluff body.

Yet still another object is to provide an insertion type vortex flowmeter comprising a vortex generating bluff body connected to a transducer and a noise sensing elongated member disposed parallel to the vortex generating bluff body and connected to another transducer, wherein the vortex generating bluff body and the noise sensing elongated member are supported by an elongated supporting member extending into the midstream of fluid flow.

Yet still a further object is to provide a vortex flowmeter comprising a planar vortex sensing member disposed downstream of and parallel to a vortex generating bluff body and connected to a transducer, and a noise sensing elongated member extending from another transducer that is disposed on a plane generally parallel to the planar vortex force sensing member, wherein the planar vortex force sensing member and the elongated noise sensing member are secured to an elongated supporting member extending into the midstream of fluid flow.

These and other objects of the present invention will become further clear as the description thereof progresses.

BRIEF DESCRIPTION OF THE FIGURES

The present invention may be described with a greater clarity and specificity by referring to the following figures:

FIG. 1 illustrates a cross section of an embodiment of the dual detectors included in the vortex flowmeter comprising a planar vortex force sensing member and an elongated noise sensing member.

FIG. 2 illustrates another cross section of the embodiment shown in FIG. 1.

FIG. 3 illustrates another embodiment of the combination of a planar vortex force sensing member and an elongated noise sensing member.

FIG. 4 illustrates a further embodiment of the combination of a planar vortex force sensing member and an elongated noise sensing member.

FIG. 5 illustrates yet another embodiment of the combination of a planar vortex force sensing member and an elongated noise sensing member.

FIG. 6 illustrates yet a further embodiment of the combination of a planar vortex force sensing member and an elongated noise sensing member.

FIG. 7 illustrates still another embodiment of the combination of a planar vortex force sensing member and an elongated noise sensing member.

FIG. 8 illustrates still a further embodiment of the combination of a planar vortex force sensing member and an elongated noise sensing member.

FIG. 9 illustrates yet still another embodiment of the combination of a planar vortex force sensing member and an elongated noise sensing member.

FIG. 10 illustrates yet still a further embodiment of the combination of a planar vortex force sensing member and an elongated noise sensing member.

FIG. 11 illustrates an additional embodiment of the combination of a planar vortex force sensing member and an elongated noise sensing member.

FIG. 12 illustrates another additional embodiment of the combination of a planar vortex force sensing member and an elongated noise sensing member.

FIG. 13 illustrates a further additional embodiment of the combination of a planar vortex force sensing member and an elongated noise sensing member.

FIG. 14 illustrates a cross section of an embodiment of the dual detectors included in the vortex flowmeter comprising a vortex generator-detector and an elongated noise sensing member.

FIG. 15 illustrates another cross section of an embodiment shown in FIG. 14.

FIG. 16 illustrates another embodiment of the combination of a vortex generator-detector and an elongated noise sensing member.

FIG. 17 illustrates a further embodiment of the combination of a vortex generator-detector and an elongated noise sensing member.

FIG. 18 illustrates another cross section of the embodiment shown in FIG. 17.

FIG. 19 illustrates yet another embodiment of the combination of a vortex generator-detector and an elongated noise sensing member.

FIG. 20 illustrates another cross section of the embodiment shown in FIG. 19.

FIG. 21 illustrates a cross section of yet a further embodiment of the combination of a vortex generator-detector and an elongated noise sensing member.

FIG. 33 illustrates another cross section of the insertion type vortex flowmeter of FIG. 32 showing an elongated noise sensing member disposed within an isolated cavity included in the elongated support member.

FIG. 34 illustrates a cross section of an insertion type vortex flowmeter comprising a planar vortex force sensing member and an elongated noise sensing member disposed downstream of a vortex generating bluff body in parallel arrangement to one another.

FIG. 35 illustrates a cross section of a transducer assembly, to which the planar vortex sensing member, the vortex generator-detector or the elongated noise sensing member is connected.

FIG. 36 illustrates an embodiment of a Piezo electric element included in the transducer assembly shown in FIG. 35.

FIG. 37 illustrates a cross section of the Piezo electric element shown in FIG. 36 and the signal flow diagram thereof.

FIG. 38 illustrates a cross section of another embodiment of the Piezo electric element and the signal flow diagram thereof.

FIG. 39 illustrates a cross section of a further embodiment of the Piezo electric element and the signal flow diagram thereof.

FIG. 40 illustrates yet another embodiment of the Piezo electric element.

FIG. 41 illustrates a cross section of the Piezo electric element shown in FIG. 40 and the signal flow diagram thereof.

FIG. 42 illustrates a cross section of yet a further embodiment of the Piezo electric element and the signal flow diagram thereof.

Figure 22:
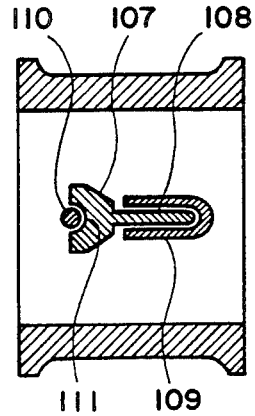
FIG. 22 illustrates a cross section of still another embodiment of the combination of a vortex generator-detector and an elongated noise sensing member.

It should be understood that those illustrative embodiments shown by the above-listed Figures are representative examples of the structures and elements executing the principles of the present inventions and consequently, there are many other alternatives and modifications of the design providing equivalents and revisions of those illustrated embodiments, which are obvious to those skilled in the art and science of flowmeter technology.

DESCRIPTION OF THE ILLUSTRATED EMBODIMENTS

The novelty and patentability of the present invention lies in the principles of physics that the two electrical signals respectively supplied by the vortex and noise sensors can be combined to eliminate the noise therebetween and obtain a resultant electrical signal representing the vortex shedding from the vortex generating bluff body, only if the noise detected by the vortex sensor and the noise detected by the noise sensor have the common mode. In other words, the two noises respectively detected by the vortex and noise sensors must have substantially identical wave forms and there must be little phase angle difference therebetween. The illustrative embodiments shown in FIGS. 1-44 illustrate preferred embodiments of the present inventions.

In FIG. 1 there is illustrated a cross section of an embodiment of the vortex flowmeter constructed in accordance with the principles of the present inventions. The flowmeter body 1 includes a flow passage 2 extending therethrough. a vortex generating bluff body 3 of an elongated cylindrical shape is disposed across a flat cross section of the flow passage 2. A planar vortex force sensing member 4 is disposed across a second cross section of the flow passage 2 downstream of the bluff body 3, wherein at least one extremity 5 of the planar vortex force sensing member is secured to the body 1 of the flowmeter, while a deflective portion 6 of the planar vortex sensing member 4 is connected to a force receiving member 7 extending from a transducer assembly 8 by a mechanical coupling 9. An elongated noise sensing member 10 disposed generally parallel to the vortex force sensing member 4 and extending from another transducer assembly 11 extends into an elongated cavity 12 included in the planar vortex force sensing ember 4 in a clearance relationship. The transducer assemblies 8 and 11 are rigidly affixed to the flowmeter body 1.

in FIG. 2 there is illustrated another cross section of the embodiment of vortex flowmeter shown in FIG 1, which cross section is taken along plane 2—2 as shown in FIG. 1. The vortex generating bluff body 3 has a blunt side facing the upstream direction. The cross section of the planar vortex force sensing member 4 has a slender streamlined shape. The elongated noise sensing member 10 extending into the elongated cavity 12 included in the planar vortex sensing member 4 is isolated from the fluid stream.

The vortex generating bluff body 1 sheds a series of vortices from the two sides thereof in an alternating pattern at a frequency proportional to the velocity of the fluid flow and, consequently, the volume flow rate of the fluid is determined from the vortex shedding frequency. The amplitude of the alternating fluid dynamic lift forces experienced by the planar vortex force sensing member 4 is generally proportional to the dynamic pressure of the fluid flow that is equal to one half of the fluid density times the square of the fluid velocity. Therefore, the mass flow rate of the fluid flow is determined from a combination of the vortex shedding frequency and the amplitude of the alternating lift force on the planar vortex force sensing member 4 generated by the sinuating streamlines trailing the bluff body 3. In actual operation, the mathematical relationship between the alternating lift force on the planar vortex sensing member 3 and the fluid velocity should be determined by calibrating the flowmeter. The fluid density is determined as a ratio of the mass flow rate to the volume flow rate. The signal generated by the transducer assembly 8 connected to the planar vortex force sensing member 4 is generated by the fluid dynamic lift force as well as the mechanical vibration of the flowmeter components, while the signal generated by the transducer assembly 11 connected to the elongated noise sensing member 10 is solely generated by the mechanical vibration of the flowmeter components. The two signals respectively generated by the transducer assemblies 8 and 11 are combined in such a way that the noises are canceled therebetween and a pure signal representing the v is obtained. The transducer element included in the transducer assembly 8 or 11 measures lateral forces experienced by the planar vortex sensing member 4 or the elongated noise detecting member 10, as the transducer element includes means for canceling out signals generated by the axial force parallel to the lengthwise direction of the planar vortex force sensor member 4 or the elongated noise sensing member 10, which means will be described in conjunction with FIGS. 35 through 42.

In FIG. 3 there is illustrated another embodiment of the vortex detector comprising a vortex force sensing planar member 13 disposed across a cross section of the flow passage 14, wherein one extremity 15 thereof is secured to the flowmeter body, while the other extremity 16 is connected to the transducer assembly 17. The elongated noise sensing member 18 extending from another transducer assembly 19 is disposed in a slit 20 partially separating the leading edge half of the planar vortex force sensing member from the trailing edge half, that is extending from the unsecured end towards the secured end of the planar vortex force sensing member 13. This arrangement of the elongated noise sensing member 18 is particularly useful when the planar vortex force sending member 13 is too thin to include an elongated cavity housing the elongated noise sensing member in an arrangement as shown in FIGS. 1 and 2. The vortex generating bluff body is not shown in this embodiment for the brevity of the illustration. The elongated noise sensing member 18 may be disposed adjacent and parallel to the leading or trailing edge of the planar vortex force sensing member in an alternative arrangement.

In FIG. 4 there is illustrated an embodiment of the vortex detector similar to that shown in FIG. 1. In this embodiment, the leading edge half of the planar vortex force sensing member 21 connected to the first transducer assembly 22 is partially separated from the trailing edge half thereof by a slit 23, wherein trailing edge portion of both extremities of the planar vortex force sensing member is secured to the flowmeter body. The elongated noise sensing member 24 extending from the second transducer assembly 25 extends into an elongated cavity 26 included in the trailing edge half of the planar vortex force sensing member 21. The elongated noise sensing member 24 may be disposed adjacent and parallel to the leading or trailing edge of the planar vortex sensing member 21 in an alterative arrangement.

In FIG. 5 there is illustrated an embodiment of the vortex detector similar to that shown in FIG. 3 with one exception. The transducer assembly 27 connected to the elongated noise sensing member 28 is disposed at the opposite side of the transducer assembly 29 connected to the planar vortex sensing member 30 across the flow passage, wherein the elongated noise sensing member 28 extends into an elongated cavity 31 included in the planar vortex force sensing member.

In FIG. 6 there is illustrated an embodiment of the vortex detector having essentially the same arrangement as the embodiment shown in FIG. 5 with one exception being that the elongated noise sensing member 32 is disposed within a slit 33 in place of an elongated cavity. The elongated noise sensing member 32 may be disposed adjacent and parallel to the leading or trailing edge of the planar vortex force sensing member in an alternative arrangement.

In FIG. 7 there is illustrated an embodiment of the vortex detector comprising a planar vortex force sending member 34 secured to the flowmeter body in a cantilever arrangement, wherein only one extremity is secured to the flowmeter body. The unsupported leading edge half of the planar vortex sensing member 34 connected to a transducer assembly 35 is partially separated from the trailing edge half by a slit 36. The elongated noise sensing member 37 extending from another transducer assembly 38 extends into an elongated cavity 39 included in the supported trailing edge half of the planar vortex force sensing member 34.

In FIG. 8 there is illustrated an embodiment of the vortex detector having essentially the same arrangement as the embodiment shown in FIG. 7 with one exception being that the elongated noise sensing member 40 is disposed within a slit 41 partially separating the leading and trailing edge halves of the planar vortex force sensing member 42 in place of the elongated cavity. The elongated noise sensing member 40 may be disposed adjacent and parallel to the leading or trailing edge of the planar vortex force sensing member 42 in an alternative arrangement.

In FIG. 9 there is illustrated an embodiment of the vortex detector comprising a planar vortex sensing member 43 including a hole 44 extending from one extremity to the other extremity thereof. One half of the hole 44 is engaged by an elongated vortex sensing member 45 extending from a first transducer assembly 46, wherein the enlarged extremity of the vortex sensing elongated member 45 engages the hole 44 in a tight fitting arrangement. The other half of the hole 44 is engaged by an elongated noise sensing member 47 in a clearance relationship therebetween, which extends from a second transducer assembly 48.

In FIG. 10 there is illustrated an embodiment of the vortex detector comprising a planar vortex force sensing member 49 with at least one extremity secured to the flowmeter body, which includes a pair of blind holes 50 and 51 extending from the secured extremity thereof. The elongated vortex sensing member 52 extending from a first transducer assembly 53 engages the hole 50 wherein the enlarged extremity of the elongated vortex sensing member 52 engages the hole 50 in a tight fitting arrangement. The elongated noise sensing member 54 extending from a second transducer assembly 55 engages the hole 51 in a clearance relationship.

In FIG. 11 there is illustrated an embodiment of the vortex detector comprising a vortex force sensing planar member 56 extending from a first transducer assembly 57, that includes an elongated cavity 58. The elongated noise sensing member 59 extending from a second transducer assembly 60 engages the elongated cavity 58 in a clearance relationship.

In FIG. 12 there is illustrated an embodiment of the vortex detector comprising a planar force sensing member 61 extending from a first transducer assembly 62 in a cantilever arrangement at least partially across a cross section of the flow passage. The elongated noise sensing member 63 extends from a second transducer assembly 64 disposed at an opposite side of the flow passage to the first transducer assembly 62. The planar vortex sensing member 61 may include a slit 65 accommodating the elongated noise sensing member 63 in a clearance relationship.

In FIG. 13 there is illustrated an embodiment of the vortex detector comprising a planar vortex force sensing member 66 extending from a first transducer assembly 67 and an elongated noise sensing member 68 extending from a second transducer assembly 69, that is disposed adjacent and parallel to the leading or trailing edge of the planar vortex force sensing member 66.

In FIG. 14 there is illustrated a cross section of an embodiment of the vortex generator-detector comprising a vortex generating bluff body 70 of an elongated cylindrical shape disposed across the flow passage 71, wherein one extremity thereof is secured to the flowmeter body 72 and the other extremity is connected to a force receiving member 73 extending from a first transducer assembly 74 by a mechanical coupling 75. The elongated noise sensing ember 76 extending from a second transducer assembly 77 disposed at the opposite side of the flow passage to the first transducer assembly 74 extends into an elongated hole 78 included in the bluff body in a clearance relationship. As an alterative arrangement, the bluff body 70 may be an extension of the force receiving member 73 and extends into the flow passage from the transducer assembly 74 in a cantilever arrangement, wherein the hole 86 extending from the free end of the bluff body 70 accommodates the elongated noise member 76.

In FIG. 15 there is illustrated another cross section of an embodiment of the vortex generator-detector shown in FIG. 14. The vortex flowmeter shown in FIGS. 14 and 15 operates on the same principles as those described in conjunction with FIGS. 1 and 2. The amplitude of the alternating lift force generated by the vortex shedding from the bluff body 70 and experienced thereby deviates significantly from the square function of the fluid velocity and, consequently, an empirical relationship determined by calibrating the flowmeter has to be employed in determining the mass flow rate from the combination of the vortex shedding frequency and the amplitude of the lift force generated by the vortex shedding.

In FIG. 16 there is illustrated an embodiment of the vortex generator-detector comprising a vortex generating bluff body 79 disposed across the flow passage, wherein one extremity 80 is secured to the flowmeter body 81 and the other extremity 82 has an extension 83 that is also secured to the flowmeter body 81 at the other end thereof. The extension 83 of the bluff body 79 includes a transducer element 84 contained therein near the junction between the bluff body 79 and the extension 83, which junction includes a cross section of reduced area providing an enhanced bending deflection thereat. The extremity 80 of the bluff body 79 may be secured fixedly to the flowmeter body 80 as shown in the illustrated embodiment or secured in a simple support or terminated without connection to the flowmeter body. The elongated noise sensing member 85 extending from another transducer assembly 86 extends into an elongated cavity 87 included in the bluff body 79.

In FIG. 17 there is illustrated a cross section of an embodiment of the vortex generator-detector comprising a vortex generating bluff body 88 rigidly secured to the flowmeter body, which bluff body includes a planar trailing edge extension 89 that is connected to a first transducer assembly 90. The planar trailing edge 89 is shrouded by a pressure shield 91 in a clearance relationship, which pressure shield is secured to the flowmeter body. The bluff body 88 includes an elongated cavity 92 that receives the elongated noise sensing member 93 extending from a second transducer assembly 94 in a clearance relationship.

In FIG. 18 there is illustrated another cross section of an embodiment shown in FIG. 17, which cross section is taken along plane 18—18 as shown in FIG. 17. The planar trailing edge extension 89 of the bluff body 88 is surrounded by the pressure shield 91 having a U-shaped cross section in a clearance relationship.

In FIG. 19 there is illustrated a cross section of an embodiment of the vortex generator-detector comprising a vortex generating bluff body 95 with one extremity secured to the flowmeter body and the other extremity connected to the force receiving member 96 extending from a first transducer assembly 97 by a mechanical coupling 98, which bluff body includes a planar trailing edge extension 99 shrouded by a pressure shield 100 secured to the flowmeter body in a clearance relationship. The trailing edge portion of the pressure shield 100 having a U-shaped cross section includes an elongated cavity 101 that receives the elongated noise sensing member 102 extending from a second transducer assembly 103 in a clearance relationship.

In FIG. 20 there is illustrated another cross section of the embodiment shown in FIG. 19, which cross section is taken along plane 20—20 as shown in FIG. 19.

In FIG. 21 there is illustrated a cross section of an embodiment of the vortex generator-detector comprising a bluff body 104 disposed across the flow passage and connected to a first transducer assembly in an arrangement described in FIG. 14 or 16, and the elongated noise sensing member 105 extending from a second transducer assembly, wherein the elongated noise sensing member 105 is disposed in a groove 106 included in the blunt leading edge face of the bluff body 104. This arrangement provides an advantage in constructing a vortex flowmeter of a small port size employing a bluff body of small cross sectional dimension.

In FIG. 22 there is illustrated a cross section of an embodiment of the vortex generator-detector having a vortex generating bluff body 107 with a planar trailing edge extension 108 shrouded by a pressure shield 109 of a U-shaped cross section, which combination is arranged as shown in FIG. 17 or 19. The elongated noise sensing member 110 is disposed in a groove 111 included in the blunt leading edge face of the bluff body 107. The elongated noise sensing member 110 may be disposed adjacent and parallel to the trailing edge of the pressure shield 109 in an alternative arrangement.

Figure 23:
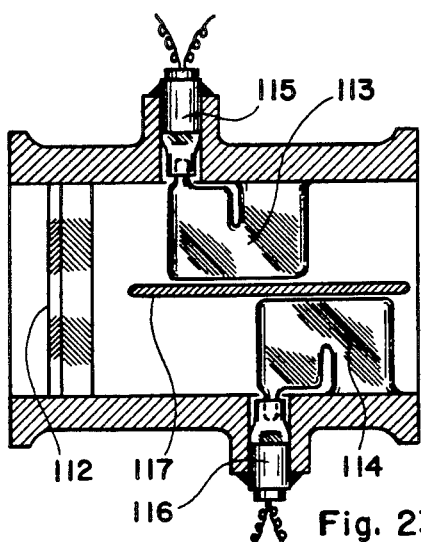
FIG. 23 illustrates a cross section of a vortex flowmeter comprising a pair of planar vortex force sensing members disposed downstream of a vortex generating bluff body in a staggered arrangement.

In FIG. 23 there is illustrated a cross section of the vortex flowmeter with dual vortex detectors, that includes a vortex generating bluff body 112 and a pair of planar vortex force sensing member 113 and 114 respectively connected to a pair of transducer assemblies 115 and 116. In the downstream region of the bluff body 112, the flow passage is divided into two equal sub-flow passages by a divider plate 117, each of which sub-flow passages includes each of the two planar vortex force sensing members 113 and 114. The two planar vortex sensing members 113 and 114 are respectively disposed at the two different cross sections of the flow passages separated from one another by a distance equal to one half wave length of the sinuating streamlines trailing the bluff body 112. As a consequence, the two planar vortex sensing members 113 and 114 experience the lift force generated by the vortex shedding in 180 degree out of phase therebetween, and experience the mechanical vibration in common phase. The noise signal generated by the mechanical vibration is canceled between the two signals respectively generated by the two transducer assemblies 115 and 116 and a pure vortex signal is obtained by combining the two signals in a differential superposition.

Figure 24:
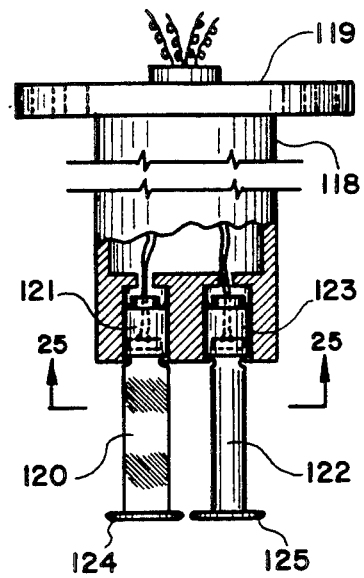
FIG. 24 illustrates an insertion type vortex flowmeter comprising a vortex generator-detector and an elongated noise sensing member disposed in a parallel relationship to the central axis of an elongated support member and secured thereto.

In FIG. 24 there is illustrated an embodiment of the insertion type vortex flowmeter, which comprises an elongated support member 118 with securing means 119 such as an anchoring flange disposed at one extremity thereof. The other extremity of the support member 118 includes a vortex generating-sensing bluff body 120 extending from a first transducer assembly 121 affixed to the elongated support member 118 and an elongated noise sensing member 119 extending from a second transducer assembly 123 affixed to the elongated support member 118, which elongated noise detecting member is disposed parallel to the bluff body 120 in a side-by-side arrangement, whereby each of the two members is out of the wake generated by the other of the two members. The flow straightener plates 124 and 125 are respectively affixed to the extremity of the bluff body 120 and the elongated noise sensing member 121 in order to create a generally two dimensional flow around the two elongated members.

Figure 25:
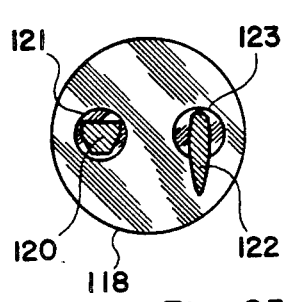
FIG. 25 illustrates a cross section of the embodiment shown in FIG. 24.

In FIG. 25 there is illustrated a cross section of the embodiment shown in FIG. 24, which cross section is taken along plane 25—25 as shown in FIG. 24. The bluff body 120 has a blunt cross section, which generates flow separation therefrom and sheds a train of vortices therefrom, while the elongated noise sensing member has a streamlined cross section around which the fluid flows smoothly without separation. As a consequence, the elongated noise sensing member 122 senses vibration noise only, while the bluff body 120 senses the alternating lift force thereon generated by the vortex shedding as well as the mechanical vibration noise. The two signals respectively generated by the two transducers 121 and 123 are combined in such a way that the mechanical vibration noises are canceled therebetween and a pure vortex signal is obtained. The volume and mass flow rates as well as the fluid density are determined by the methods described in conjunction with FIGS. 1 and 2.

Figure 26:
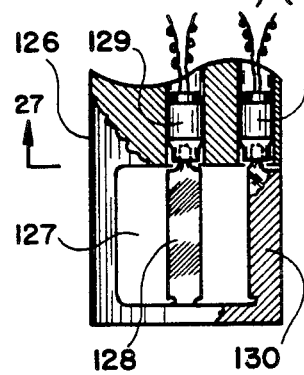
FIG. 26 illustrates another embodiment of the insertion type vortex flowmeter comprising a vortex generator-detector and an elongated noise sensing member disposed in a parallel relationship to the central axis of an elongated support member and secured thereto.

In FIG. 26 there is illustrated an embodiment of the insertion type vortex flowmeter comprising an elongated support member 126 that includes a flow passage 127 disposed therethrough in a perpendicular arrangement with respect to the central axis of the elongated support member 126. The vortex generating-sensing bluff body 128 is disposed across the flow passage 127 wherein one extremity thereof is secured to the wall of the flow passage 127 and the other extremity is connected to a first transducer assembly 129. The elongated noise sensing member 130 with one extremity secured to the wall of the flow passage 127 and the other extremity connected to a second transducer assembly 131 is disposed within a cavity included in one side wall of the flow passage in a parallel relationship to the vortex generator-sensor 128.

Figure 27:
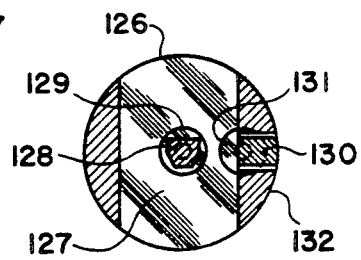
FIG. 27 illustrates a cross section of the embodiment shown in FIG. 26.

In FIG. 27 there is illustrated a cross section of the embodiment shown in FIG. 26, which cross section is taken along plane 27—27 as shown in FIG. 26. The elongated noise sensing member 130 hidden in a cavity included in one side wall 132 of the flow passage 127 is shielded from the main stream fluid flow and, consequently, it senses mechanical vibration noise only.

Figure 28:
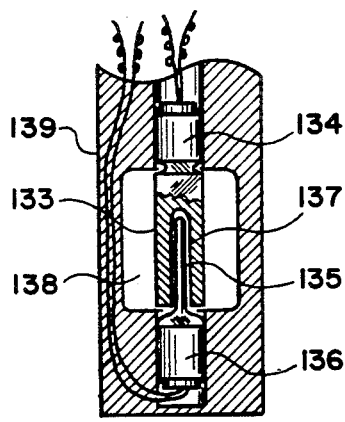
FIG. 28 illustrates a cross section of an insertion type vortex flowmeter comprising a vortex generator-detector and an elongated noise sensing member extending into an elongated cavity included in the vortex generating bluff body.

In FIG. 28 there is illustrated a cross section of an embodiment of the insertion type vortex flowmeter comprising a vortex generator-sensor 133 extending from a first transducer assembly 134 and an elongated noise sensing member 135 extending from a second transducer assembly 136 and extending into an elongated cavity 137 included in the vortex generating-sensing bluff body 133, which combination is disposed across a flow passage 138 laterally disposed through one extremity of the elongated support member 139.

Figure 29:
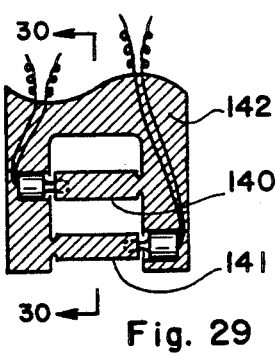
FIG. 29 illustrates an insertion type vortex flowmeter comprising a vortex generator-detector and an elongated noise sensing member disposed in a perpendicular arrangement with respect to the central axis of an elongated support member and secured thereto.

In FIG. 29 there is illustrated a cross section of an embodiment of the insertion type vortex flowmeter, which has a construction similar to that of the embodiment shown in FIG. 26 with a few exceptions. In this embodiment, the vortex generating-sensing bluff body 140 and the elongated noise sensing member 141 are disposed in a perpendicular arrangement to the central axis of the elongated support member 142, which arrangement provides a powerful advantage in eliminating the mechanical vibration noises from the signals generated by the transducer assemblies, as the inertia force resulting from flexural vibration of the elongated support member associated with the lateral vibratory motion of the pipeline structure occurs as an axial loading on the transducer element contained in the transducer assembly, wherein the stress resulting from such an axial loading does not generate any signal from the transducer elements shown in FIGS. 35 through 42.

Figure 30:
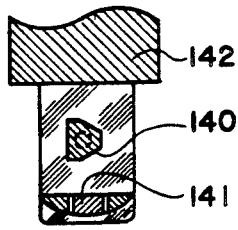
FIG. 30 illustrates a cross section of the embodiment shown in FIG. 29.

In FIG. 30 there is illustrated another cross section of the embodiment shown in FIG. 29, which cross section is taken along plane 30—30 as shown in FIG. 29. The elongated noise sensing member 141 is disposed in a cavity included in the wall of the flow passage in order to shield it from the fluid dynamic force, which cavity may be partially open to the fluid flow or completely isolated from the flow as shown in the embodiment illustrated in FIG. 33. It is readily recognized that the combination of the vortex sensor-generator and the elongated noise sensing member shown in FIG. 28 can be disposed in a perpendicular arrangement as shown in FIG. 29.

Figure 31:
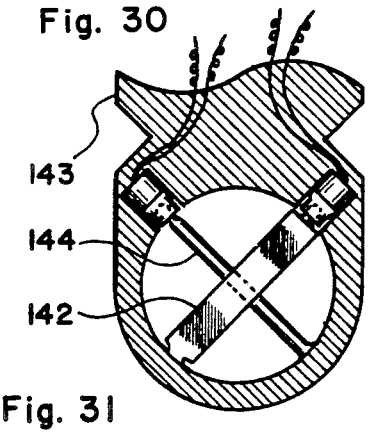
FIG. 31 illustrates an insertion type vortex flowmeter comprising a vortex generator-detector and an elongated noise sensing member disposed in a crossing arrangement.

In FIG. 31 there is illustrated a cross section of an embodiment of the insertion type vortex flowmeter comprising a vortex generator-sensor 142 disposed across a first cross section of the flow passage laterally disposed through the elongated supporting member 143, and an elongated noise sensing member 144 disposed across a second cross section of the flow passage downstream of the vortex generating-sensing bluff body 142 in a perpendicular arrangement to the bluff body.

Figure 32:
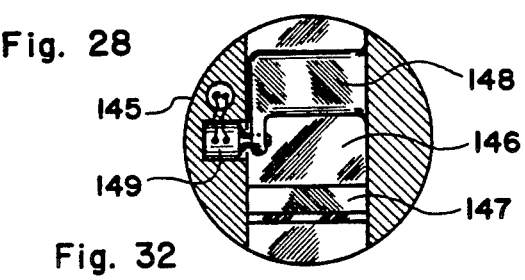
FIG. 32 illustrates a cross section of an insertion type vortex flowmeter showing a vortex generating bluff body and a planar vortex force sensing member disposed downstream of the bluff body.

In FIG. 32 there is illustrated a first cross section of the elongated support member 145 of an insertion type flowmeter, which cross section includes the central axis of the flow passage 146 disposed laterally through the elongated support member 145. A vortex generating bluff body 147 is disposed across the flow passage 146 and secured to the wall of the flow passage 146. A planar vortex force sensing member 148 is disposed generally parallel to and downstream of the bluff body 147, wherein a deflective portion thereof is connected to a first transducer assembly 149.

In FIG. 33 there is illustrated a second cross section of the same elongated support member 145 as that shown in FIG. 32, which cross section taken along a plane parallel to the first cross section shown in FIG. 32 is located at a close proximity to the flow passage 146 without cutting through the flow passage 146. The elongated noise sensing member 150 extending from a second transducer assembly 151 is disposed within an elongated cavity 152 included in the elongated support member 145 in a parallel relationship to the planar vortex force sensing member 148.

In FIG. 34 there is illustrated a cross section of an insertion type vortex flowmeter, which cross section passes through a flow passage 153 disposed laterally through an elongated support member 154. A planar vortex force sensing member 155 connected to a first transducer assembly 156 and an elongated noise sensing member 157 connected to a second transducer assembly 158 are disposed downstream of the vortex generating bluff body 159 across the flow passage 154 in a side-by-side arrangement. It should be understood that all of the illustrated combinations of the vortex generating member, vortex sensing member and the noise sensing member shown in FIGS. 1 through 34 are compatible with the construction of an in-line vortex flowmeter as well as an insertion vortex flowmeter, which combination may be disposed parallel or perpendicular to the central axis of the elongated support member.

In FIG. 35 there is illustrated a cross section of an embodiment of the transducer assembly that is connected to the planar vortex force sensing member or to the vortex generating-sensing bluff body, which cross section is taken along a plane generally parallel to the direction of the fluid flow. The transducer assembly comprises a transducer container 160 including a cavity 161 surrounded by a thin wall 162 at one side and by rigid walls on the other sides. The thin wall 162 includes a reinforcing rib 163 disposed on a plane parallel to the direction of the fluid flow and extending thereacross, from which a force receiving member 164 extends. The force receiving member 164 includes mechanical coupling means disposed at the extremity thereof for connecting the deflective portion of the planar vortex force sensing member or that of the vortex generator-sensor 165. If the construction of the planar vortex force sensing member or the vortex generator-sensor is integral to the transducer assembly, the planar vortex force sensing member or the vortex generator-sensor is constructed as an extension of the reinforcing rib 162. A Piezo electric disc element 166 is disposed within the cavity 161 and is pressed against the thin wall 162 by a threaded plug 167 threadedly engaging the open end of the cavity 161. The conductor wires 168 and 169 extending from the Piezo electric disc element 166 are routed through the hole 170 axially disposed through the plug 167.

In FIG. 36 there is illustrated a plan view of an embodiment of the Piezo electric transducer 166 disposed in the cavity 161 of the transducer container 160, which Piezo electric transducer 166 is viewed across plane 36—36 as shown in FIG. 35. The Piezo electric transducer 166 comprises two semicircular planar Piezo electric elements 171 and 172 respectively disposed on two opposite sides of a reference plane including the reinforcing rib 163.

In FIG. 37 there is illustrated a cross section of the Piezo electric transducer 166 shown in FIG. 36, which cross section is taken along plane 37—37 as shown in FIG. 36. The two semicircular planar Piezo electric elements 171 and 172 are oppositely polarized. The electrodes of the two planar Piezo electric elements 171 and 172 disposed on one side thereof are respectively connected to two amplifiers 173 and 174 including means 175 for balancing the signal strength therebetween, whereby the two signals respectively generated by the two planar Piezo electric elements 171 and 172 are combined in such a way that the signals representing the axial loading in the direction perpendicular to the plane of the Piezo electric transducer 166 are canceled and signals representing the lateral force acting in a direction parallel to the plane of the Piezo electric disc element 166 transmitted to the force receiving member 164 are obtained.

In FIG. 38 there is illustrated another embodiment of the Piezo electric transducer, that comprises a single planar Piezo electric element 176 with electrodes split along a reference plane including the reinforcing rib 163. One of the two electrodes 177 and 178 disposed on one side of the Piezo electric element 176 and the other of the two electrodes 179 and 180 disposed on the other side thereof are respectively connected to a pair of amplifiers 181 and 182 including signal balancing means 183 therebetween. The other of the two electrodes 177 and 178 and one of the two electrodes 179 and 180 are grounded.

In FIG. 39 there is illustrated a further embodiment of the Piezo electric transducer comprising a pair of semicircular planar Piezo electric elements 184 and 185 disposed symmetrically about a plane including the reinforcing rib 163, which pair of Piezo electric elements are polarized opposite to one another and have common electrodes 186 and 187 respectively disposed on two opposite sides thereof, wherein the two electrodes 186 and 187 are respectively connected to a noninverting amplifier 188 and an inverting amplifier 189, which combination of amplifiers include signal balancing means 190. It should be mentioned that the first pair of electrodes 177 and 178 included in the embodiment shown in FIG. 38 may be respectively connected to the pairs of amplifiers shown in FIG. 39 and the second pair of electrodes 179 and 180 may be grounded in an alternative circuit arrangement of the Piezo electric transducer shown in FIG. 38.

In FIG. 40 there is illustrated a plan view of an embodiment of the Piezo electric transducer that is capable of providing a calibration of the ratio of the fluid dynamic lift force to the amplitude of the electrical signal generated by the lift force on a real time basis. This Piezo electric transducer comprises a signal planar circuit Piezo electric element, wherein each side thereof includes three electrodes 191, 192 and 193. The middle electrode 192 straddles a reference plane including the reinforcing rib 163, while the two side electrodes 191 and 193 are disposed generally symmetrically about said reference plane.

In FIG. 41 there is illustrated a cross section of the Piezo electric transducer shown in FIG. 40, which cross section is taken along plane 41—41 as shown in FIG. 40. One side electrode 191 disposed on one side of the Piezo electric transducer and the other side electrode 196 disposed on the other side thereof are respectively connected to a pair of amplifiers 197 and 198 with signal balancing means 199 therebetween, while the remaining side electrodes 193 and 194 are grounded. The middle electrodes 192 and 195 are connected to an electric power supply 200 through a switch 201. A pulse of electric potential of known magnitude applied across the two middle electrodes 192 and 195 generates an electric potential difference V across the outputs from the two amplifiers. The ratio of the output potential difference V to the input potential supplied by the electric power source 200 provides a factor that up-dates the ratio of the vortex force to the amplitude of the electric signal generated thereby. For example, an upto-date conversion factor converting the amplitude of the electrical signal generated by the vortex force to the magnitude of the vortex force is obtained by multiplying the electrical pulse input to electrical pulse output ratio provided by the action of the electrical power source 200 to the initial value of the conversion factor obtained by calibrating the vortex flowmeter at the factory.

In FIG. 42 there is illustrated an alterative electric circuit arrangement for the same Piezo electric transducer as that shown in FIGS. 40 and 41. The two side electrodes disposed on one side of the Piezo electric element are respectively connected to a noninverting amplifier 202 and an inverting amplifier 203 including a signal balancing means 204 therebetween, while the two side electrodes disposed on the other side thereof are grounded. The two middle electrodes are connected to an electric power supply through a switch. It should be mentioned that the embodiments of the combination of the vortex detector and noise detector shown in FIGS. 1-34 also operate in conjunction with other types of transducers different from those shown in FIGS. 35-42 and consequently, the present inventions are not limited to those embodiments specifically employing the Piezo electric transducers shown and described.

Figure 43:
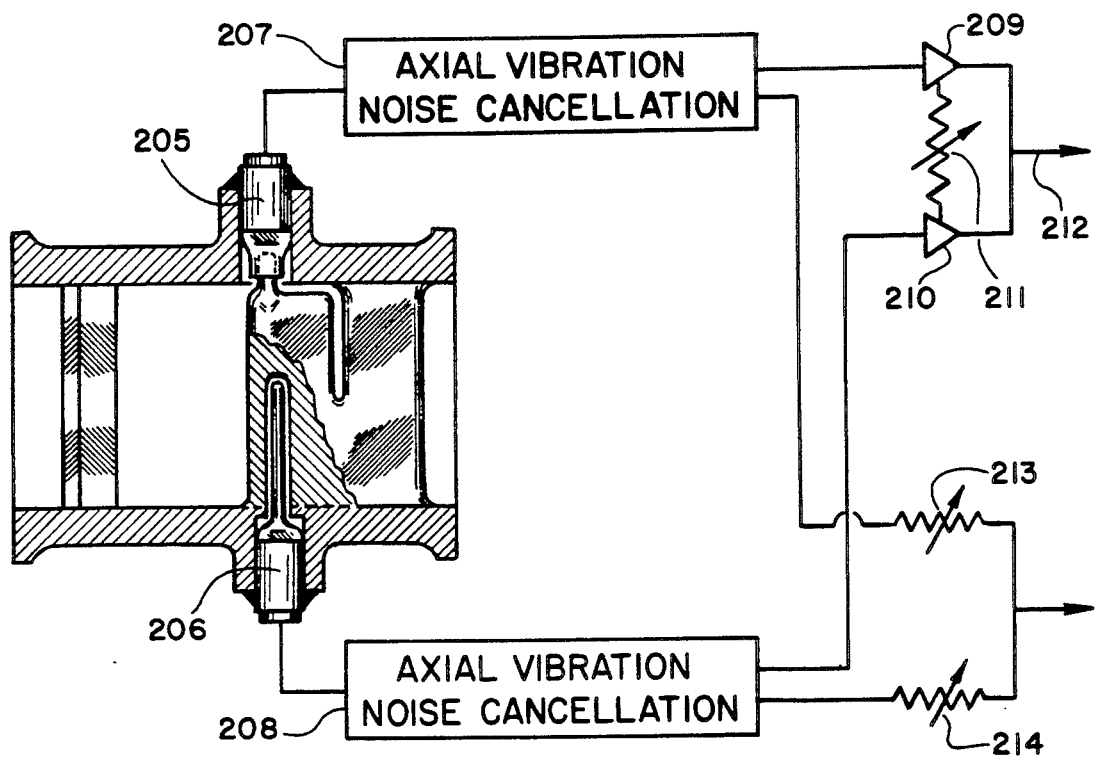
FIG. 43 illustrates an embodiment of the electrical circuit combining the two electrical signals respectively supplied by the vortex and noise sensing transducers.

In FIG. 43 there is illustrated an embodiment of the noise canceling electric circuit that combines the two electrical signals respectively supplied by the vortex sensing transducer 205 and the noise sensing transducer 206. The noise associated with the axial component mechanical vibrations taking place in directions parallel to the lengthwise axis of the vortex and noise sensors, that is included in the two electrical signals, is eliminated by the axial component vibration noise canceling circuits 207 and 208, which are the same noise canceling circuit as that shown in FIG. 37, 38 or 39. The two output electrical signals from the noise canceling circuits 207 and 208, which are now substantially free of noise associated with the axial component mechanical vibrations are combined by using the same noise canceling circuit as that shown in FIG. 37, which includes a pair of amplifiers 209 and 210, and a signal balancing means 211 as shown in FIG. 43, that cancels noise associated with the lateral component mechanical vibrations taking place in directions perpendicular to the lengthwise axis of the vortex and noise sensors. These lateral component mechanical vibrations occur in the same directions as those of the alternating fluid dynamic force generated by the vortices shed from the vortex generator and consequently, the noise therefrom is impossible to get rid of without employing the two sensors respectively sensing the vortices and the noise as taught by the present inventions. The resultant electrical signal 212 substantially free of all mechanical vibration noises provides the vortex signal, from which the flow variables such as the volume and mass flow rates as well as the density of fluid are determined. Depending on the relative polarities of the transducers employed in the vortex and noise sensors, the noise canceling circuit eliminating the noise associated with the lateral component mechanical vibrations shown in FIG. 43 may be replaced with the noise canceling circuit shown in FIG. 44. As an alternative to the noise canceling circuits shown in FIGS. 43 and 44, the vortex and noise signals can be combined after a pair of variable resistors 213 and 214, wherein one or both thereof can be adjusted to cancel noise between the two electrical signals.

Figure 44:
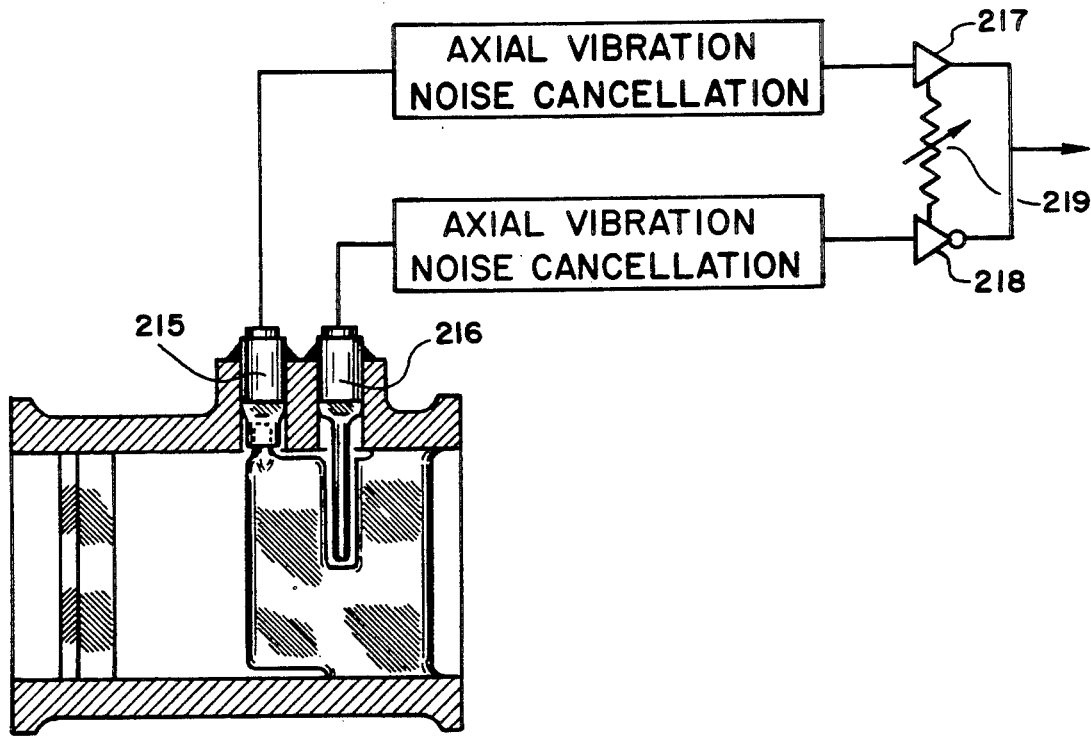
FIG. 44 illustrates another embodiment of the noise canceling electrical circuit combining the two electrical signals respectively supplied by the vortex and noise sensing transducers.

In FIG. 44 there is illustrated another embodiment of the noise canceling electric circuit canceling out the noise associated with the lateral component mechanical vibrations, that combines the two electrical signals respectively supplied by the vortex sensing transducers 215 and the noise sensing transducer 216, which noise canceling electric circuit including a noninverting amplifier 217, an inverting amplifier 218 and a signal balancing means 219 is the same noise canceling electric circuit as that shown in FIG. 39.

While the principles of the present inventions have now been made clear by the illustrative embodiments, there will be immediately obvious to those skilled in the art many modifications of the structures, arrangements, proportions, elements and materials, which are particularly adapted to the specific working environments and operating condition in the practice of the inventions without departing from those principles. It is not desired to limit the inventions to the particular illustrative embodiments shown and described and accordingly, all suitable modifications and equivalents may be regarded as falling within the scope of the inventions as defined by the claims which follow.

The embodiments of the invention, in which an exclusive property or privilege is claimed, are defined as follows:

1. An apparatus for measuring fluid flow comprising in combination:
    a) a body including a flow passage;
    b) a vortex passage generator of elongated cylindrical shape disposed across a first cross section of the flow passage;
    c) a vortex sensor of planar shape disposed generally parallel to the vortex generator on a plane generally parallel to the central axis of the flow passage at least partially across a second cross section of the flow passage, said vortex sensor experiencing mainly fluid dynamic force associated with vortices shed from the vortex generator;
    d) a first transducer assembly secured to the body and including a force transmitting member connected to a deflective portion of the vortex sensor, said first transducer assembly including an electrical output means supplying a first electrical signal representing mainly vortices shed from the vortex generator;
    e) a noise sensor of elongated shape with a small surface area disposed interiorly to the fluid passage generally parallel to the vortex sensor at close proximity to the vortex sensor on a cross section of the flow passage generally coinciding with a cross section of the flow passage occupied by the vortex sensor in an arrangement substantially free of any enclosure enclosing the noise sensor said noise sensor experiencing mainly inertia forces associated with mechanical vibrations; and
    f) a second transducer assembly secured to the body and including a force transmitting member connected to the noise sensor, said second transducer assembly including an electrical output means supplying a second electrical signal representing mainly the mechanical vibrations.

2. A combination as set forth in claim 1 wherein said combination includes an electric circuit means for combining the first and second electrical signals in such a way that noise associated with the mechanical vibration is canceled therebetween and a resultant electrical signal representing the vortices is obtained.

3. A combination as set forth in claim 2 wherein volume flow rate of the fluid is determined from frequency of an alternating electrical signal provided by the resultant electrical signal.

4. A combination as set forth in claim 2 wherein mass flow rate of the fluid is determined from a combination of frequency and amplitude of an alternating electrical signal provided by the resultant electrical signal.

5. A combination as set forth in claim 2 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

6. A combination as set forth in claim 2 wherein the noise sensor is disposed in a cutout included in the vortex sensor in a clearance relationship, wherein surface area of the noise sensor exposed to the fluid is substantially smaller than surface area of the vortex sensor exposed to the fluid.

7. A combination as set forth in claim 2 wherein the noise sensor is disposed exteriorly and adjacent to the vortex sensor, wherein surface area of the noise sensor exposed to the fluid is substantially smaller than surface area of the vortex sensor exposed to the fluid.

8. A combination as set forth in claim 2 wherein at least a portion of one extremity of the vortex sensor is secured to the body and the deflective portion of the vortex sensor is connected to the force transmitting member of the first transducer assembly by a mechanical coupling.

9. A combination as set forth in claim 2 wherein extremity of the vortex secured to and extends from the force transmitting member of the first transducer assembly.

10. A combination as set forth in claim 9 wherein extremity of the vortex sensor opposite to the first transducer assembly is secured to the body.

11. A combination as set forth in claim 2 wherein the body includes an elongated extension disposed generally perpendicular to the central axis of the flow passage, wherein the elongated extension includes an anchoring means disposed at one extremity thereof.

12. A combination as set forth in claim 11 wherein volume flow rate of the fluid is determined from frequency of an alternating electrical signal provided by the resultant electrical signal.

13. A combination as set forth in claim 11 wherein mass flow rate of the fluid is determined from a combination of frequency and amplitude of an alternating electrical signal provided by the resulting electrical signal.

14. A combination as set forth in claim 11 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

15. An apparatus for measuring fluid flow comprising in combination:
   a) a body including a flow passage;
   b) an elongated cylindrical member generating vortices disposed across a cross section of the flow passage, said elongated cylindrical member experiencing mainly fluid dynamic force associated with vortex shedding therefrom;
   c) a first transducer assembly secured to the body and including a force transmitting member connected to the elongated cylindrical member, said first transducer assembly including an electrical output means supplying a first electrical signal representing mainly vortex shedding from the elongated cylindrical member;
   d) a noise sensor of elongated shape with a small surface area disposed interiorly to the fluid passage generally parallel to the elongated cylindrical member at close proximity to the elongated cylindrical member on a cross section of the flow passage generally coinciding with a cross section of the flow passage occupied by the elongated cylindrical member in an arrangement substantially free of any enclosure enclosing the noise sensor said noise sensor experiencing mainly inertia forces associated with mechanical vibrations; and
   e) a second transducer assembly secured to the body and including a force transmitting member connected to the noise sensor, said second transducer assembly including an electrical output means supplying a second electrical signal representing mainly the mechanical vibrations.

16. A combination as set forth in claim 15 wherein said combination includes an electric circuit means for combining the first and second electrical signals in such a way that noise associated with the mechanical vibration is canceled therebetween and a resultant electrical signal representing vortex shedding from the elongated cylindrical member is obtained.

17. A combination as set forth in claim 16 wherein volume flow rate of the fluid is determined from frequency of an alternating electrical signal provided by the resultant electrical signal.

18. A combination as set forth in claim 16 wherein mass flow rate of the fluid is determined from a combination of frequency and amplitude of an alternating electrical signal provided by the resultant electrical signal.

19. A combination as set forth in claim 16 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

20. A combination as set forth in claim 16 wherein the noise sensor is disposed exteriorly to the elongated cylindrical member, wherein surface area of the noise sensor exposed to the fluid is substantially smaller than surface area of the elongated cylindrical member exposed to the fluid.

21. A combination as set forth in claim 16 wherein the elongated cylindrical member is secured to the body at one extremity and connected to the force transmitting member of the first transducer assembly at the other extremity opposite to said one extremity by a mechanical coupling.

22. A combination as set forth in claim 16 wherein the elongated cylindrical member is secured to and extends from the force transmitting member of the first transducer assembly.

23. A combination as set forth in claim 22 wherein said extremity of the elongated cylindrical member opposite to the first transducer assembly is secured to the body.

19

24. A combination as set forth in claim 16 wherein the elongated cylindrical member includes a planar trailing edge extension engaging a groove in a clearance relationship, wherein said groove is included in a planar member disposed across a cross section of the flow passage adjacent and downstream to the elongated cylindrical member and secured to the body.

25. A combination as set forth in claim 24 wherein the force transmitting member of the first transducer assembly is connected to a deflective portion of the planar trailing edge extension.

26. A combination as set forth in claim 16 wherein the body includes an elongated extension disposed generally perpendicular to the central axis of the flow passage, wherein the elongated extension includes an anchoring means disposed at one extremity thereof.

27. A combination as set forth in claim 26 wherein volume flow rate of the fluid is determined from frequency of an alternating electrical signal provided by the resultant electrical signal.

28. A combination as set forth in claim 26 wherein mass flow rate of the fluid is determined from a combination of frequency and amplitude of an alternating electrical signal provided by the resultant electrical signal.

29. A combination as set forth in claim 26 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

30. An apparatus for measuring fluid flow comprising in combination:
  a) a body including a flow passage;
  b) an elongated cylindrical member generating vortices disposed across a cross section of the flow passage, said elongated cylindrical member including a planar trailing edge extension, wherein the trailing edge extension experiences mainly fluid dynamic force associated with vortex shedding from the elongated cylindrical member;
  c) a planar member disposed across a cross section of the flow passage adjacent and downstream to the elongated cylindrical member in a generally parallel arrangement to the elongated cylindrical member, said planar member including a groove receiving the planar trailing edge extension of the elongated cylindrical member in a clearance relationship, wherein said planar member is secured to the body;
  d) a first transducer assembly secured to the body and including a force transmitting member connected to the combination of the elongated cylindrical member and the planar trailing edge extension thereof, said first transducer assembly including an electrical output means supplying a first electrical signal representing mainly vortex shedding from the elongated cylindrical member;
  e) a noise sensor of elongated shape disposed parallel to the elongated cylindrical member within a cavity included in the planar member, said noise sensor experiencing mainly inertia forces associated with mechanical vibrations; and
  f) a second transducer assembly secured to the body and including a force transmitting member connected to the noise sensor, said second transducer assembly including an electrical output means supplying a second electrical signal representing mainly the mechanical vibrations.

31. A combination as set forth in claim 30 wherein said combination includes an electric circuit means for combining the first and second electrical signals in such a way that noise associated with the mechanical vibration is canceled therebetween and a resultant electrical signal representing vortex shedding from the elongated cylindrical member is obtained.

32. A combination as set forth in claim 31 wherein volume flow rate of the fluid is determined from frequency of an alternating electrical signal provided by the resultant electrical signal.

33. A combination as set forth in claim 31 wherein mass flow rate of the fluid is determined from a combination of frequency and amplitude of an alternating electrical signal provided by the resultant electrical signal.

34. A combination as set forth in claim 31 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

35. A combination as set forth in claim 31 wherein the body includes an elongated extension disposed generally perpendicular to the central axis of the flow passage, wherein the elongated extension includes an anchoring means disposed at one extremity thereof.

36. A combination as set forth in claim 35 wherein volume flow rate of the fluid is determined from frequency of an alternating electrical signal provided by the resultant electrical signal.

37. A combination as set forth in claim 35 wherein mass flow rate of the fluid is determined from a combination of frequency and amplitude of an alternating electrical signal provided by the resultant electrical signal.

38. A combination as set forth in claim 35 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

39. An apparatus for measuring fluid flow comprising in combination:
  a) a body including a flow passage;
  b) a vortex passage generator of elongated cylindrical shape disposed across a first cross section of the flow passage;
  c) a vortex sensor of planar shape disposed generally parallel to the vortex generator on a plane generally parallel to the central axis of the flow passage at least partially across a second cross section of the flow passage, said vortex sensor experiencing mainly fluid dynamic force associated with vortices shed from the vortex generator;
  d) a first transducer assembly secured to the body and including a force transmitting member connected to a deflective portion of the vortex sensor, said first transducer assembly including an electrical output means supplying a first electrical signal representing mainly vortices shed from the vortex generator;
  e) a noise sensor of elongated shape disposed interiorly to the fluid passage generally parallel to the vortex sensor within a cavity included in the vortex sensor in a clearance relationship; said noise sensor experiencing mainly inertia forces associated with mechanical vibrations; and f) a second transducer assembly secured to the body and including a force transmitting member connected to the noise sensor, said second transducer assembly including an electrical output means supplying a second electrical signal representing mainly the mechanical vibrations.

40. A combination as set forth in claim 39 wherein said combination includes an electric circuit means for combining the first and second electrical signals in such a way that noise associated with the mechanical vibration is canceled therebetween and a resultant electrical signal representing the vortices is obtained.

41. A combination as set forth in claim 40 wherein the force transmitting member of the first transducer assembly engages an elongated cavity included in the vortex sensor and is secured to the vortex sensor at extremity of said force transmitting member, and the noise sensor engages an elongated cavity included in the vortex sensor in a clearance relationship.

42. A combination as set forth in claim 40 wherein volume flow rate of the fluid is determined from frequency of an alternating electrical signal provided by the resultant electrical signal.

43. A combination as set forth in claim 40 wherein mass flow rate of the fluid is determined from a combination of frequency and amplitude of an alternating electrical signal provided by the resultant electrical signal.

44. A combination as set forth in claim 40 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

45. A combination as set forth in claim 40 wherein at least a portion of one extremity of the vortex sensor is secured to the body and the deflective portion of the vortex sensor is connected to the force transmitting member of the first transducer assembly by a mechanical coupling.

46. A combination as set forth in claim 40 wherein the vortex sensor is secured to and extends from the force transmitting member of the first transducer assembly.

47. A combination as set forth in claim 46 wherein extremity of the vortex sensor opposite to the first transducer assembly is secured to the body.

48. A combination as set forth in claim 40 wherein the body includes an elongated extension disposed generally perpendicular to the central axis of the flow passage, wherein the elongated extension includes an anchoring means disposed at one extremity thereof.

49. A combination as set forth in claim 48 wherein volume flow rate of the fluid is determined from frequency of an alternating electrical signal provided by the resultant electrical signal.

50. A combination as set forth in claim 48 wherein mass flow rate of the fluid is determined from a combination of frequency and amplitude of an alternating electrical signal provided by the resultant electrical signal.

51. A combination as set forth in claim 48 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

52. An apparatus for measuring fluid flow comprising in combination:

a) a body including a flow passage;

b) an elongated cylindrical member generating vortices disposed across a cross section of the flow passage, said elongated cylindrical member experiencing mainly fluid dynamic force associated with vortex shedding therefrom;

c) a first transducer assembly secured to the body and including a force transmitting member connected to the elongated cylindrical member, said first transducer assembly including an electrical output means supplying a first electrical signal representing mainly vortex shedding from the elongated cylindrical member;

d) a noise sensor of elongated shape disposed interiorly to the flow passage generally parallel to the elongated cylindrical member in a clearance relationship, said noise sensor experiencing mainly inertia forces associated with mechanical vibrations; and e) a second transducer assembly secured to the body and including a force transmitting member connected to the noise sensor, said second transducer assembly including an electrical output means supplying a second electrical signal representing mainly the mechanical vibrations.

53. A combination as set forth in claim 52 wherein said combination includes an electric circuit means for combining the first and second electrical signals in such a way that noise associated with the mechanical vibration is canceled therebetween and a resultant electrical signal representing vortex shedding from the elongated cylindrical member is obtained.

54. A combination as set forth in claim 53 wherein volume flow rate of the fluid is determined from frequency of an alternating electrical signal provided by the resultant electrical signal.

55. A combination as set forth in claim 53 wherein mass flow rate of the fluid is determined from a combination of frequency and amplitude of an alternating electrical signal provided by the resultant electrical signal.

56. A combination as set forth in claim 53 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

57. A combination as set forth in claim 53 wherein the elongated cylindrical member is secured to the body at one extremity and connected to the force transmitting member of the first transducer assembly at the other extremity opposite to said one extremity by a mechanical coupling.

58. A combination as set forth in claim 53 wherein the elongated cylindrical member is secured to and extends from the force transmitting member of the first transducer assembly.

59. A combination as set forth in claim 58 wherein said extremity of the elongated cylindrical member opposite to the first transducer assembly is secured to the body.

60. A combination as set forth in claim 53 wherein the elongated cylindrical member includes a planar trailing edge extension engaging a groove in a clearance relationship, wherein said groove is included in a planar member disposed across a cross section of the flow passage adjacent and downstream to the elongated cylindrical member and secured to the body.

61. A combination as set forth in claim 60 wherein the force transmitting member of the first transducer assembly is connected to a deflective portion of the planar trailing edge extension.

62. A combination as set forth in claim 53 wherein the body includes an elongated extension disposed generally perpendicular to the central axis of the flow passage, wherein the elongated extension includes an anchoring means disposed at one extremity thereof.

63. A combination as set forth in claim 62 wherein volume flow rate of the fluid is determined from frequency of an alternating electrical signal provided by the resultant electrical signal.

64. A combination as set forth in claim 62 wherein mass flow rate of the fluid is determined from a combination of frequency and amplitude of an alternating electrical signal provided by the resultant electrical signal.

65. A combination as set forth in claim 62 wherein density of the fluid is determined from ratio of mass flow rate of the fluid determined from a combination of frequency and amplitude of an alternating electrical signal provided by the resultant electrical signal to volume flow rate of the fluid determined from the frequency of said alternating electrical signal.

* * * * *